(12) United States Patent
Kavaler

(10) Patent No.: US 7,379,466 B2
(45) Date of Patent: May 27, 2008

(54) IN BAND SIGNAL DETECTION AND PRESENTATION FOR IP PHONE

(75) Inventor: Robert A. Kavaler, Kensington, CA (US)

(73) Assignee: Innomedia Pte Ltd, Singapore (SG)

( * ) Notice: Subject to any disclaimer, the term of this patent is extended or adjusted under 35 U.S.C. 154(b) by 852 days.

(21) Appl. No.: 10/826,204

(22) Filed: Apr. 17, 2004

(65) Prior Publication Data

US 2005/0232309 A1 Oct. 20, 2005

(51) Int. Cl.
*H04L 12/28* (2006.01)
*H04L 12/56* (2006.01)

(52) U.S. Cl. ..................... 370/412; 370/516

(58) Field of Classification Search ............... 370/516, 370/230.1; 375/226; 702/69, 79; 713/2, 713/100; 709/234; 711/118; 326/17
See application file for complete search history.

(56) References Cited

U.S. PATENT DOCUMENTS

| | | | |
|---|---|---|---|
| 6,434,606 B1* | 8/2002 | Borella et al. | 709/214 |
| 6,862,298 B1* | 3/2005 | Smith et al. | 370/516 |
| 2002/0101885 A1* | 8/2002 | Pogrebinsky et al. | 370/516 |
| 2003/0026275 A1 | 2/2003 | Lansafame et al. | |
| 2003/0112758 A1* | 6/2003 | Pang et al. | 370/235 |
| 2004/0047369 A1 | 3/2004 | Goel | |
| 2004/0052209 A1* | 3/2004 | Ortiz | 370/230 |
| 2004/0057445 A1 | 3/2004 | LeBlanc | |

\* cited by examiner

*Primary Examiner*—Chirag G Shah
*Assistant Examiner*—Nima Mahmoudzadeh
(74) *Attorney, Agent, or Firm*—Timothy P. OHagan

(57) ABSTRACT

A system for reducing jitter in a packet audio reception device comprises an output time stamp index, a delay calculation module, and a histogram module. The output time stamp index determines an initial output time stamp value upon receipt of a jitter buffer latency value and increments the output time stamp upon release of each of the frames by a jitter buffer. The delay calculation module calculates a delay value for each of the sequence of received frames. The histogram module periodically calculates a target delay value which, based on a buffered history of values representing the delay value of each of a fixed quantity of the most recently received frames, would have resulted in a predetermined portion of the fixed quantity of frames being dropped, and adjusting the jitter buffer latency value to a value equal to the target value.

19 Claims, 5 Drawing Sheets

| Configuration Value Table 200 | | | |
|---|---|---|---|
| Parameter 201 | Value | Default Value | Description |
| outOfSyncFrames 204 | | 30 | If The Absolute Value of Delay is Greater Than outOfSyncFrames Then a Reset is Generated |
| initialLatency 206 | | 4 | Initial Value of jbLatency After Reset |
| minLatency 208 | | 1 | Minimum Value of jbLatency |
| maxDelay 210 | | 30 | if Delay is Greater Than maxDelay Then the Packet is Dropped, also, jbLatency is Not Allowed to Exceed maxDelay |
| packetsPerGram 212 | | 200 | Maximum Number of Packets Represented by One Subhistogram |
| grams 214 | | 10 | Quantity of Subhistograms |
| bin 216 | | 16 | Quantity of bins in Each Subhistogram |
| dropsPerMil 218 | | 3 | Number of Allowed Packet Drops in 1000 Packets |
| hysteresis 220 | | 1 | Minimum Difference Between Target Delay and jbLatency for Change in jbLatency |
| maxDrops (Decrement) 222 | | 30 | Maximum Decrement in jbLatency |
| maxAdds (Increment) 224 | | 30 | Maximum Decrement in jbLatency |

Figure 6

IN BAND SIGNAL DETECTION AND PRESENTATION FOR IP PHONE

TECHNICAL FIELD

The present invention relates to packet voice communications, and more particularly to systems and methods which correct for variable latency in receipt of data packets containing compressed audio data.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each of the two endpoint telephones is coupled to a local switching station by a dedicated pair of copper wires known as a subscriber loop. The two switching stations are connected by a trunk line network comprising multiple copper wire pairs. When a telephone call is placed, the circuit is completed by dynamically coupling each subscriber loop to a dedicated pair of copper wires in the trunk line network.

Because each call is placed over a dedicated circuit, the delay in transmission of the audio signal is only the transmission latency of the dedicated circuit—which is typically imperceptible and remains relatively constant for the entire duration of the telephone call. Due to speech or other audio data being continuous in nature, an imperceptible and constant transmission delay is required to accurately reproduce the speech or other audio data at a receiving system.

More recently, the analog circuits between switching stations have been replaced with digital transmission mediums which carry compressed digital audio data for multiple telephone calls simultaneously. More specifically, at a first switching station the audio may be digitized, compressed, and framed for transmission across the digital transmission medium. At the receiving switching station, the frames are collected and audio is reproduced. To avoid irregularity in the time of arrival of transmitted frames (e.g. jitter) and gaps in the reproduced audio, a dedicated periodic time slot on the transmission medium is reserved for each telephone call. In effect, the dedicated time slot solution is equivalent to a dedicated circuit between the two stations.

More recently, Advances in the speed of data transmissions and Internet bandwidth have made it possible for telephone conversations to be communicated using the Internet's packet switched architecture with the overhead of Voice over Internet Protocols (VoIP) such as the Real Time Protocol (RTP) and the UDP/IP protocols.

In general VoIP utilizes network bandwidth more efficiently in that bandwidth on any transmission segment may be utilized without reservation of dedicated time slots for audio channels. Further, the routers of the Internet may route each frame from its source to its destination based on real time segment usage.

A problem with use of VoIP for maintaining a telephone call between two stations is that the transmission latency is not constant. The transmission time between when a frame is released from the first station and received at the destination varies with each frame. This variation is referred to as frame jitter. Further, frames may arrive out of sequence or may not even arrive at all if the frame is lost in a buffer overflow at a router along the Internet. This jitter and frame loss can cause gaps and clipping in the reproduced audio.

To compensate for frame jitter, jitter buffers have been developed. In general, a jitter buffer receives each frame from the transmission medium and then provides the frames to a decompression circuit. While the frames may be received with variable latency, the frames may be output to the decompression circuit at periodic intervals—so long as the jitter buffer does not empty or overflow. While a large jitter buffer with significant delay reduces the probability of the buffer becoming empty or overflowing, the significant delay itself degrades the quality of the telephone call.

To improve call quality, adaptive jitter buffers have been developed. In general, an adaptive jitter buffer increases the delay (and therefore the number of frames in the buffer) when jitter increases (increasing variation in frame latency) to assure that the buffer does not empty and decreases delay when jitter decreases (decreasing variation in frame latency) to decrease the overall delay between when the audio is spoken at the source station and reproduced at the receiving station.

Known adaptive jitter buffer systems are slow to react to changes in frame jitter. What is needed is an improved adaptive jitter buffer system and jitter correction method that does not suffer the reaction delays and other disadvantages of known systems.

SUMMARY OF THE INVENTION

A first aspect of the present invention is an improved adaptive jitter buffer system for reducing jitter in a packet audio reception device such as a Voice over Internet Protocol (VoIP) telephone or terminal adapter.

The jitter buffer system comprises a jitter buffer, a delay calculation module, an output time stamp index module, and a histogram module—which, in the aggregate control a jitter buffer.

The jitter buffer stores a plurality of audio frames and provides for each of the plurality of audio frames to be released to a decompression circuit upon receipt of a signal therefore.

The delay calculation module receives each of the plurality of audio frames and, for each of the plurality of audio frames: i) calculates a delay value, ii) drops the frame if the delay value is less than zero; iii) drops the frame if the delay value is greater than a predetermined maximum delay value; and iv) writes the frame to the jitter buffer if the delay value is greater than zero and less than the predetermined maximum delay value. The delay value is equal to the time difference between the output time stamp value and a transmission time stamp assigned to the frame by a transmitting system.

The output time stamp index module determines an initial output time stamp following receipt of a jitter buffer latency value from the histogram module. The initial output time stamp value is equal to the sum of a transmission time stamp assigned to a first frame and the jitter buffer latency value. Thereafter, the output time stamp index module increments the output time stamp value by a time period upon each release of a from the jitter buffer to the decompression circuit.

The histogram module is coupled to each of the output time stamp index and the delay calculation module. The histogram module periodically; i) calculates a target delay value which, based on a buffered history of histogram values, would have resulted in a predetermined portion of a fixed quantity of the most recently received frames being dropped; ii) adjusting the jitter buffer latency value to a value equal to the target value; and iii) providing the jitter buffer latency value to the output time stamp index module.

Each histogram value represents the delay value of each of the fixed quantity of the most recently received frames. More specifically, the histogram value may be the value of delay less the current jitter buffer latency value.

In the exemplary embodiment, there exist rules regarding the adjustment of the jitter buffer latency value. For example, the histogram module: i) only adjusts the jitter buffer latency value to the target value if the difference between the jitter buffer latency value and the target value is greater than a preconfigured hysteresis threshold; ii) adjusts the jitter buffer latency value to a maximum preconfigured jitter buffer latency value if the target delay value is greater than the maximum preconfigured jitter buffer latency value; iii) adjusts the jitter buffer latency value to a minimum preconfigured jitter buffer latency value if the target delay value is less than the minimum preconfigured jitter buffer latency value; iv) decrements the jitter buffer latency value by a predetermined maximum decrement value if adjusting the jitter buffer latency value to the target delay would result in decrementing the jitter buffer latency value by more than the predetermined maximum decrement value; and v) increments decrements the jitter buffer latency value by a predetermined maximum increment value if adjusting the jitter buffer latency value to the target delay would result in incrementing the jitter buffer latency value by more than the predetermined maximum increment value.

The histogram module may: i) calculate a histogram value from each delay value; ii) store each histogram value in a bin or a sub-gram associated with the current jitter buffer latency value; and iii) calculate the target delay value upon completion of the sub-gram. The sub-gram may be a logical portion of a histogram memory comprising a predetermined quantity of logical bins. The sub-gram is considered complete when the predetermined quantity of histogram values have been stored in the sub-gram (e.g. the bins are full).

The histogram module may calculate the target delay value by: i) determining a low value which the predetermined portion of the histogram values are less than the low value and the remainder of the histogram values are greater than the low value; and ii) setting the target delay value to the difference between zero and the low value.

In addition, the histogram module may calculate a quantity of frames that must be added or dropped to compensate for a discontinuity in the output time stamp sequence caused by the adjustment in the jitter buffer latency value. The histogram module may add the value of the jitter buffer latency to the low value to generate a resulting value. If the resulting value is greater than zero, a quantity of frames equal to the resulting value divided by the output time stamp increment are dropped from the jitter buffer. If the resulting value is less than zero, a quantity of frames equal to (the absolute value of) the resulting value divided by the output time stamp increment are created and added to the jitter buffer.

For a better understanding of the present invention, together with other and further aspects thereof, reference is made to the following description, taken in conjunction with the accompanying drawings. The scope of the present invention is set forth in the appended claims.

BRIEF DESCRIPTION OF THE DRAWINGS

FIG. 6 is a table representing exemplary configuration values for the jitter buffer system of the present invention.

DETAILED DESCRIPTION OF THE EXEMPLARY EMBODIMENTS

Figure 1:
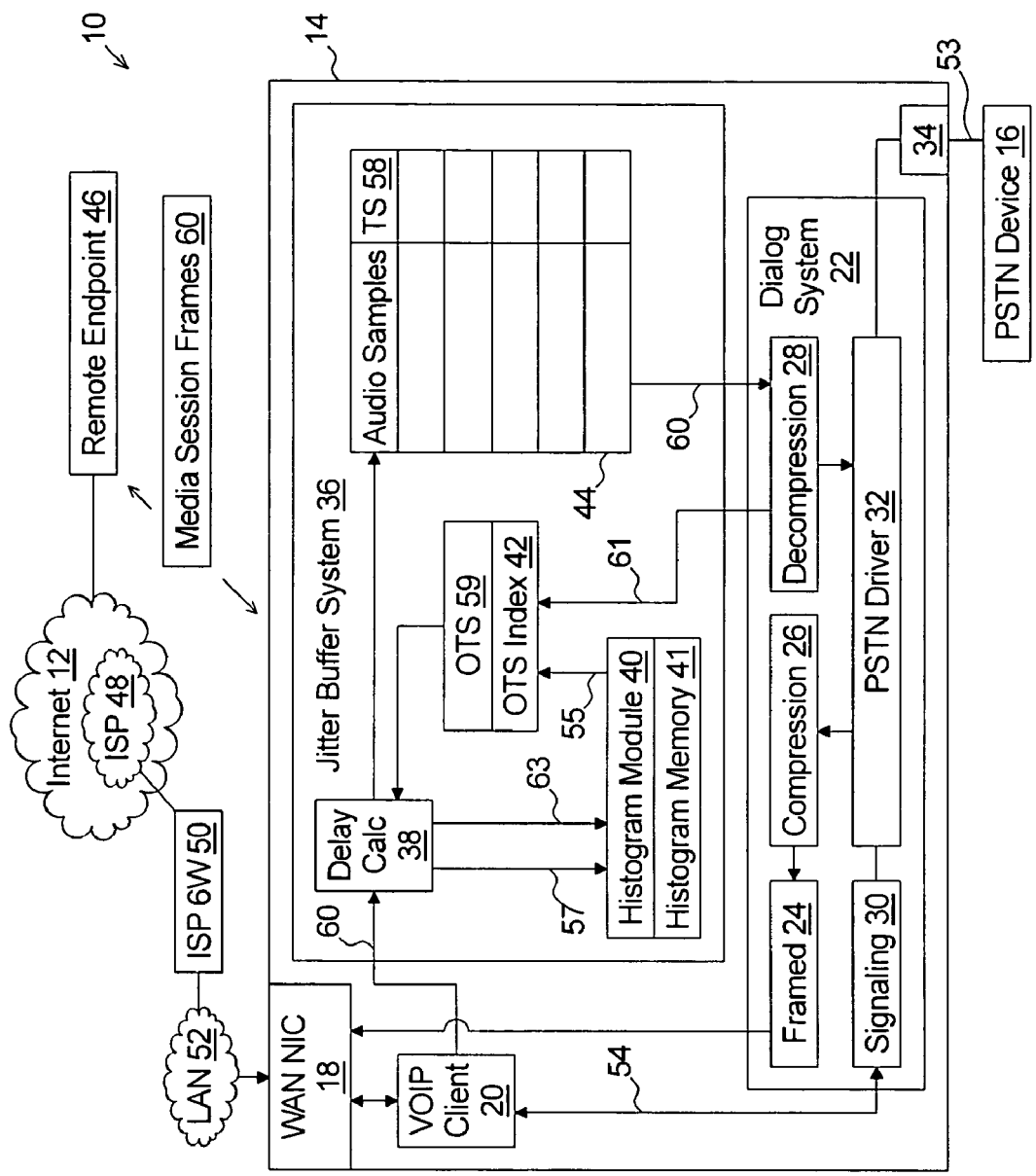
FIG. 1 is a block diagram representing a system for providing VoIP communication services over a frame switched network in accordance with one embodiment of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements discussed in this specification may be implemented in a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

FIG. 1 represents a voice over Internet Protocol (VoIP) system 10 which includes a terminal adapter 14 useful for implementing the improved adaptive jitter buffer system 36 of the present invention. Although the improved adaptive jitter buffer system 36 is implemented within a terminal adapter 14 for purposes of illustrating the invention, it should be appreciated that the invention is useful in conjunction with other packet audio systems such as voice over Internet Protocol (VoIP) telephones.

The system 10 comprises a frame switched network, such as the Internet 12, interconnecting a plurality of VoIP telephony endpoints such as the terminal adapter 14 and a remote endpoint 46. In the exemplary embodiment, the terminal adapter 14 is coupled to a traditional PSTN telephone device 16 and a local area network 52. The local area network 52 in turn is coupled to an ISP network 48 (which is a part of the Internet 12) by an ISP gateway 50. In exemplary embodiments, the ISP network 48 and gateway 50 may be: i) a hybrid fiber/cable network and cable modem respectively; ii) a telephony service provider network and digital subscriber line (DSL) modem respectively, or iii) other known networking technologies for providing Internet services to a customer's premises.

In operation, the terminal adapter 14 emulates a central office switch at a PSTN port 34 for providing telephone service to the PSTN device 16 coupled thereto. The PSTN telephone service may be provided utilizing traditional PSTN analog or digital call signaling and voice band communications. The terminal adapter 14 further links the PSTN call signaling and voice band communications (e.g. a PSTN call leg) with VoIP call signaling and media session communications (e.g. a VoIP call leg) over the internet 12 to the remote endpoint 46 to facilitate a telephone call between the PSTN device 16 and the remote endpoint 46.

Figure 2:
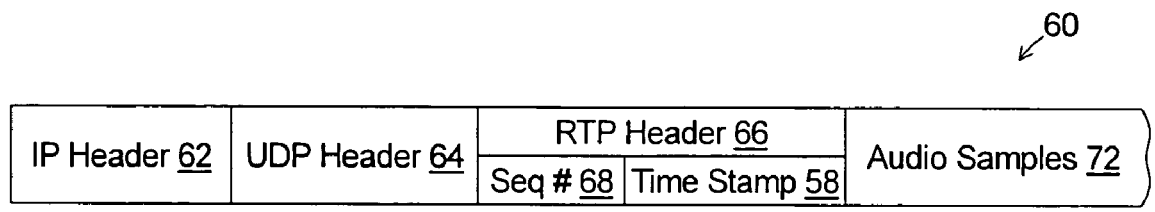
FIG. 2 is a block diagram representing an exemplary VoIP frame in accordance with one embodiment of the present invention.

Turning briefly to FIG. 2, an exemplary media session frame 60 for transporting compressed digital audio over the Internet 12 is shown in block diagram form. The media session frame 60 comprises an IP header 62, a UDP header 64, an RTP header 66, and audio samples 72 which are compressed digital audio data representing a discrete portion of the voice band.

The IP header 62 comprises such information as the source IP address from which the frame 60 was generated and destination IP address to which the frame 60 is to be routed over the Internet 12. The UDP header 64 comprises such information as the port number which identifies the source and destination applications. The RTP header 66 comprises such information as a sequence number 68 and a transmission time stamp 58. The sequence number 68 defines the frame's sequence or position amongst a plurality of other frames generated by the framing module 24. The transmission time stamp 58 represents a time at which the frame was generated. The difference between transmission time stamp values of sequential frames represents the period between frames and also should approximate the duration of time represented by the audio samples 72 within the frame. The transmission time stamp 58 and the sequence number 68 provide information needed for re-generation of voice band at the receiving VoIP device even though transmission latency time for each frame 60 may vary randomly from that of other frames 60.

Returning to FIG. 1, the terminal adapter 14 may comprise a VoIP client 20, a dialog system 22, jitter buffer system 36, as well as each of a network interface 18 for coupling to the local area network 52 and a PSTN FXO port 34 for coupling to the traditional PSTN telephony device 16.

The network interface 18 utilizes known physical layer systems which are compliant with those utilized by the local area network 52 and known internet protocol systems (typically referred to as an "IP Stack") for communicating with remote IP endpoints over the local area network 52. In the exemplary embodiment, the physical layer systems of the network interface 18 may operate a known communication standard such as USB or Ethernet for communicating with the ISP gateway 50.

In operation, the network interface 18 receives session set up frames from the VoIP client 20 and media session frames from the dialog system 22, packages the frames as UDP/IP frames with applicable source and destination socket information, and forwards the UDP/IP frames to the applicable remote device over the local area network 52. The network interface 18 also receives UDP/IP frames over the local area network 52 and presents the data therein to either the VoIP client 20 or the dialog system 22 based on a destination socket (IP address and port number) of the received frame.

The VoIP client 20 may operate known VoIP signaling systems such as: i) the Media Gateway Control Protocol (MGCP, RFC3435, RFC3661) for exchanging call set up messages with a call agent (not shown), gateway (not shown) and/or the remote endpoint 46; or ii) the Session Initiation Protocol (SIP) for exchanging call set up messages with a SIP compliant proxy server (not shown) and/or the remote endpoint 46.

The VoIP client 20 also includes circuits for exchanging call signaling and session status signals 52 with the dialog system 22 such that the dialog system 22 may exchange corresponding call signaling and session status signals (such as ringing, busy, and MGCP caller ID messages) with the PSTN device 16 as known analog or digital signaling appropriately modulated onto the PSTN link 53.

The dialog system 22 may be embodied in a digital signal processing (DSP) circuit and may include a PSTN driver module 32, a signaling module 30, a decompression module 28, a compression module 26, and a framing module 24.

The PSTN driver 32 is coupled to each of the signaling module 30, the compression module 26, the decompression module 28, and the PSTN device 16 (via a PSTN port 34 to which the PSTN device 16 is coupled). In operation the PSTN driver 32 emulates a central office switch for providing telephone service to the PSTN device 16 over the link 53. More specifically, the PSTN driver 32 detects a voice band signal generated by the PSTN device 16 (e.g. local voice band), samples the signal at 800 Khz to generate a digital audio signal, and provides the digital audio signal to each of the signaling module 30 and the compression module 26. With respect to voice band generated by the remote endpoint 46 (remote voice band), the PSTN driver receives a digital audio signal from the decompression module 28 (representing the remote voice band) and recreates PSTN analog or digital voice band for coupled to the PSTN device 16.

The signaling module 30; i) receives the digital representation of the local voice band from the PSTN driver 32; ii) utilizes pattern matching techniques to detect traditional tone call signaling within the local voice band such as DTMF tones, and provides corresponding signals 54 to the VoIP client 20 such that the VoIP client 20 can generate corresponding VoIP messages for transmission to the applicable endpoint over the network 12.

The signaling module 30 further receives signals 54 from the VoIP client 20 (corresponding to VoIP messages received by the VoIP client 20) and provides corresponding digital signaling to the PSTN driver 32 such that the PSTN driver can appropriately modulate corresponding voice band signaling (e.g. in-band signaling) such as dial tone, DTMF tones, ring back signal, busy signals, call waiting signal, caller ID signals, and flash signals on the PSTN link 53.

The compression module 26 receives the digital representation of the local voice band from the PSTN driver 32 and operates algorithms which compress the local voice band into compressed digital audio samples 78. The audio samples 78 are linked to the framing module 24 which: i) packages such samples into a real-time protocol (RTP) stream of frames; and ii) presents each frame of the RTP stream to the network interface circuit 18 for packaging as a UDP/IP frame 60 for transport to the destination endpoint.

The decompression module 28 receives from the jitter buffer system 36, each frame of an RTP stream of compressed digital audio generated by the remote endpoint 46, in response to generating a clock signal 61 therefore. The decompression module 28 further decompress the audio samples within each frame 60 to re-generate a digital representation of the remote voice band—which in turn is coupled to the PSTN driver 32 for recreation of the remote voice band on the PSTN link 53.

Exemplary compression/decompression algorithms utilized by the compression module 26 and the decompression module 28 include: i) algorithms that provide minimal (or no) compression (useful for fax transmission) such as algorithms commonly referred to as G.711, G726; ii) very high compression algorithms such as algorithms commonly referred to as G.723.1 and G.729D; and iii) algorithms that provide compression and high audio quality such as algorithms commonly referred to as G.728, and G.729E.

Jitter Buffer System

As discussed in the background, a problem with VoIP telephony is that, even though frames may be transmitted in sequence and at regular periods, the frames may arrive at the destination endpoint both out of sequence and with variations in their transport times (e.g. the time it takes for each frame to be routed from its source to its destination over the Internet will vary).

To enable the voice band of the remote endpoint 46 to be regenerate at the terminal adapter 14, a jitter buffer system 36 is used for buffering frames. In operation, the jitter buffer system 36 corrects for variations in transport time between frames. More specifically, the jitter buffer system 36 receives each frame sent by the remote endpoint 46, stores each received frame in a jitter buffer 44, and sequentially releases frames from the jitter buffer 44 to the decompression module 28 of the dialog system 22 at a release period time corresponding to a clock signal 61 provided by the decompression module 28 (discussed herein).

Effectively, the jitter buffer 44 generates an additional delay (e.g. buffer delay) between receiving the frame and release of the frame to the dialog system 22 such that the Internet transport delay plus buffer delay (collectively jitter buffer latency) is generally a fixed latency for all frames.

It should be appreciated that if the jitter buffer latency is a small value, certain frames with a high transport delay will have a transport delay greater than the jitter buffer latency and will be unusable. These are lost frames which are dropped and result in degradation of quality of the re-created voice band.

It should also be appreciated that if the jitter buffer latency value is large, although frames may not be dropped, the large jitter buffer latency may create a delay of the re-created voice band noticeable to the user.

The jitter buffer system 36 comprises a jitter buffer 44, a output time stamp index module 42, a delay calculation module 38, and a histogram module 40. In operation, the output time stamp index module 42 calculates an output time stamp 59 after receiving each jbLatency value 55 (which are periodically provided by the histogram module 40). The output time stamp 59 will be a transmission time stamp 58 of the first frame received following the reset plus the jbLatency value 55. Thereafter, the output time stamp 59 is incremented by a fixed value each time a frame is released to the decompression module 38 in response to the clock signal 61. The fixed value may be referred to as the increment.

The delay calculation circuit 38 calculates a delay value 63 for each received frame 60 by subtracting the transmission time stamp 58 from the output time stamp value 59. If the result is either negative (e.g. under-run) or greater than a predetermined maximum allowable delay, the delay calculation circuit 38 drops the frame. (e.g. either the frame is not written to the jitter buffer 44 or is removed from the jitter buffer 44).

In addition, if the delay calculation circuit 38 detects a significant change in the value of transmission time stamp 58 between sequential frames, the delay calculation circuit 38 will generate a reset signal 57 to the histogram module 40 to force the histogram module 40 to provide a new value of jbLatency 55.

The histogram module 40 provides an initial value of jbLatency 55 to the output time stamp index module 42 upon start of a sequence for frames and upon the output time stamp index module 42 providing a reset signal 57.

Further, the histogram module 40 receives each delay value 63 and calculates a histogram value for storage in a histogram memory 41. The histogram value is equal to the delay value 63 minus the current value of jbLatency 55—or, stated another way, the histogram value is a normalized delay value that would have been the delay had the value of jbLatency been zero.

The histogram memory 41 may be a storage system utilized to represent a plurality of graphical histograms—each referred to as a sub-histogram. The sub-histogram includes a fixed quantity of sequential histogram values which correspond to a single value of jbLatency 55. When a sub-histogram reaches its limit of values, that sub-histogram is considered complete and a new sub-histogram is started.

Following completion of each sub-histogram a new value of jbLatency 55 may be calculated based on the histogram values stored in the most recent predetermined number of sub-histogram completed. The new value of jbLatency 55 is provided to the output time stamp index module 42 such that it may again calculate an initial value of output time stamp 59 (e.g. when reset). In addition, frames within the jitter buffer 44 may be added or dropped to compensate for the adjustment of jbLatency 55—or, stated another way, frames may be created or dropped to accommodate a the adjustment in the buffer delay. It should be appreciated that the created frames can not be real audio data, but comprise filler audio data or audio data extrapolated from adjacent (in time) frames to provide hardware of the decompression module 28 with compressed audio data on a periodic basis while still adjusting time.

Except for threshold limitations and minimum/maximum value limitations, the new value of jbLatency 55 is a delay value which, if it had been used as the jbLatency value 55 during the histogram period, would have resulted in a predetermined portion of the frames being dropped. More specifically, a configuration value known as dropsPerMil 218 (FIG. 6) may be the predetermined portion of frames expressed in a quantity of frames per one-thousand frames.

Figure 3:
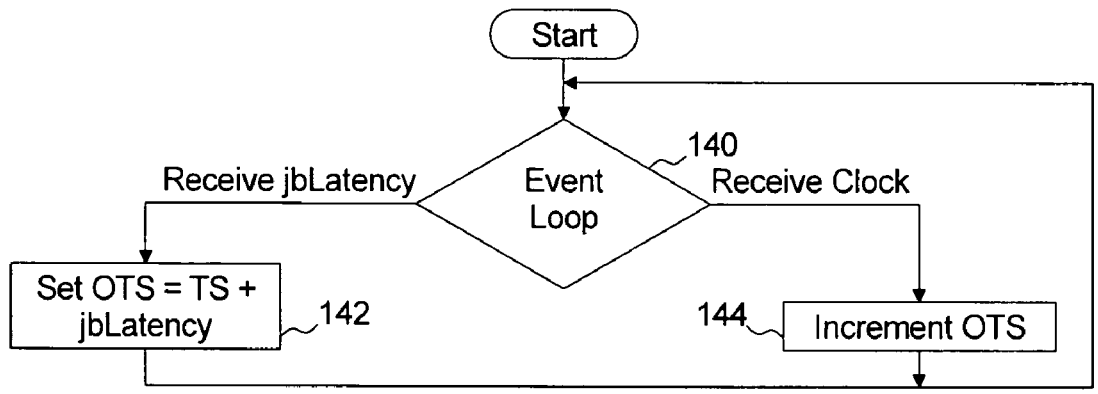
FIG. 3 is a flow chart representing exemplary operation of an output time stamp index module in accordance with one embodiment of the present invention.

The flow chart of FIG. 3 represents exemplary operation of the output time stamp index 42. The two inputs of the output time stamp index 42 are a jbLatency value 55 from the histogram module 40 and a clock signal 61 from the decompression module 28. Step 140 represents an event loop waiting for on of those two inputs.

In the event that a jbLatency value 55 is received, the output time stamp index 42 calculates an initial value of output time stamp 59 by setting output time stamp 59 equal to the value of jbLatency 55 plus the value of transmit time stamp 58 of the next received frame (or the most recently received frame). Calculation of output time stamp 59 is represented by box 142 and after performing the calculation, the output time stamp index 42 returns to the event loop 140.

In the event that a clock signal 61 is received, the output time stamp index 42 increments the value of output time stamp 59 by the fixed increment at step 144—and thereafter returns to the event loop 140.

Figure 4:
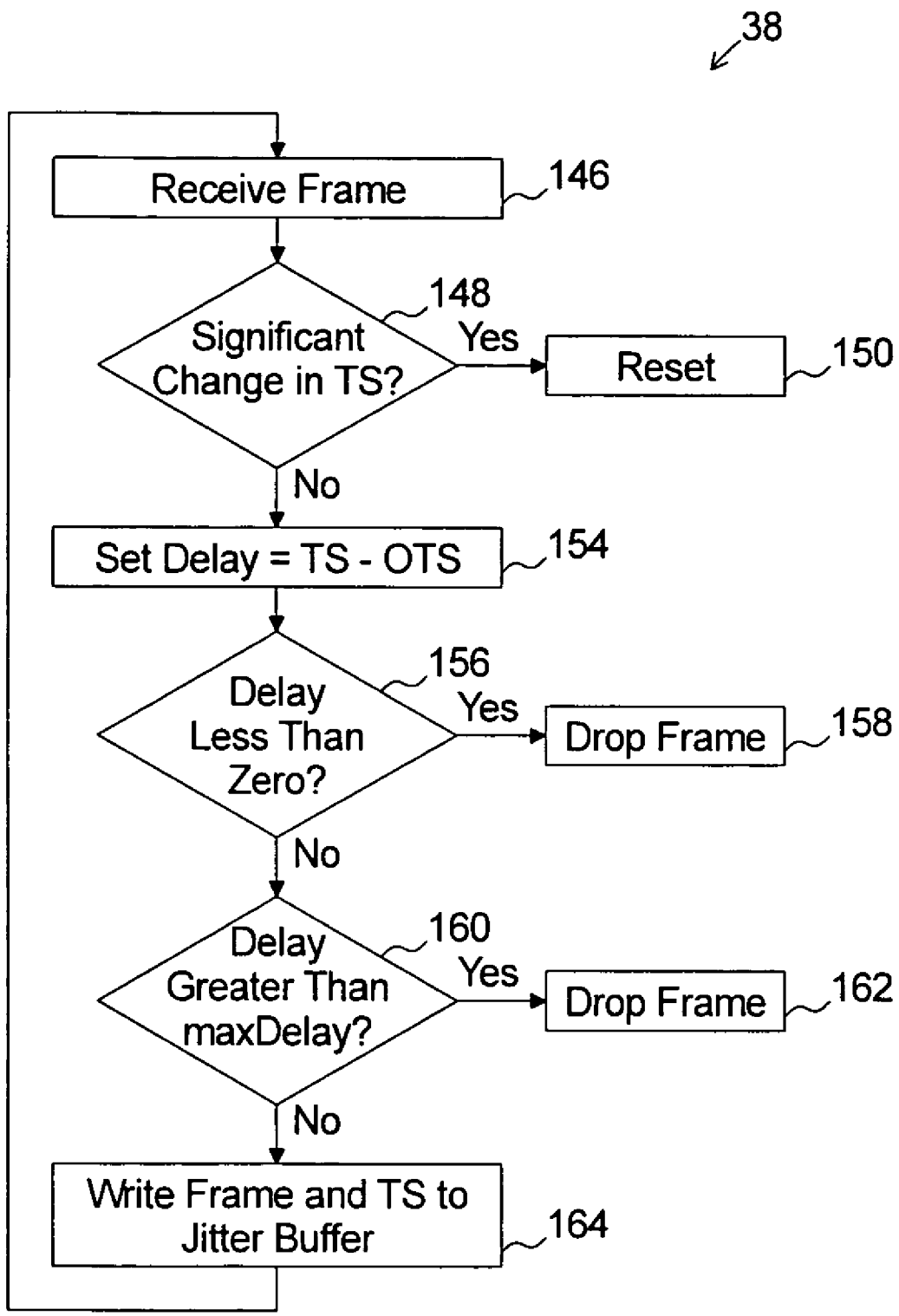
FIG. 4 is a flow chart representing exemplary operation of a delay calculation circuit in accordance with one embodiment of the present invention.

The flow chart of FIG. 4 represents exemplary operation of the delay calculation module 38. Step 146 represents receiving a frame 60 from the network interface circuit 18.

Step 148 represents determining whether there has been a significant change in the value of transmission time stamp 58. If the change in the value of transmission time stamp 58 between frames is significant it should be appreciated that a significant discontinuity exists. As such, a reset signal 57 is generated at step 150 such that a new value of jbLatency 55 can be calculated and a new value of output time stamp 59 can be calculated.

Alternatively, if there is not a significant change in the value of transmission time stamp 58, the delay calculation circuit sets the value of delay 63 equal to the value of transmission time stamp 58 of the frame 60 less the value of the output time stamp 59 at step 154.

If delay 63 is less than zero, as represented by decision box 156, or greater than a preconfigured value known as maxDelay 210 (FIG. 6) as represented by decision box 160, the frame 60 is dropped as represented by boxes 158 and 162 respectively.

If the frame 60 is not dropped, the frame (and its transmission time stamp value 58) are written to the jitter buffer 44 at step 164 and the value of delay 63 is provided to the histogram module 40.

Figure 5:
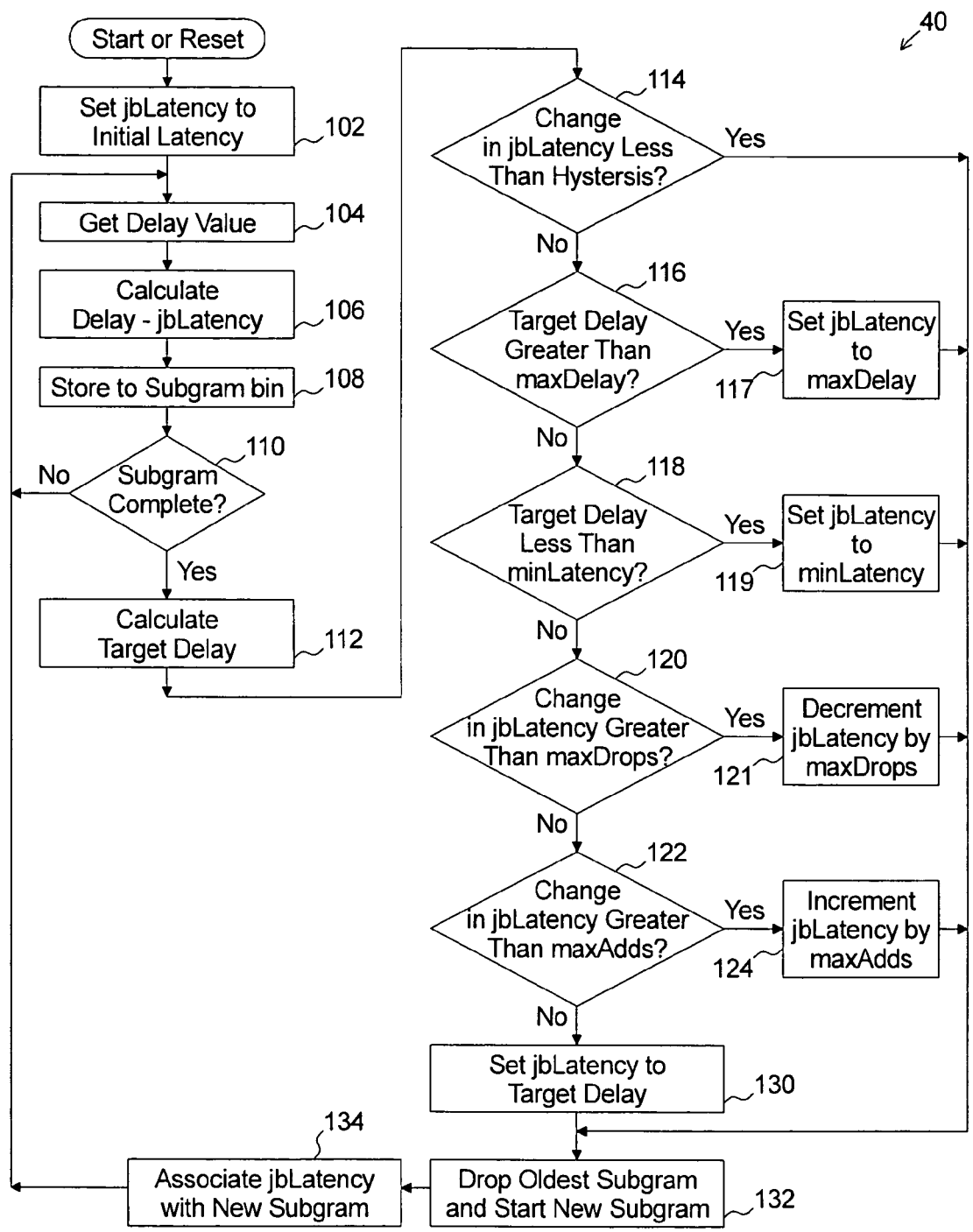
FIG. 5 is a flow chart representing exemplary operation of a histogram module in accordance with one embodiment of the present invention.

The flow chart of FIG. 5 represents exemplary operation of the histogram module 40 which, as discussed, periodically generates the values of jbLatency 55 used by the output time stamp index module 42 to assign values of output time stamp 59 to received frames.

Step 102 represents setting the value of jbLatency 55 equal to the value of initialLatency 208. The value of initialLatency 208 is a configurable parameter stored in the configuration value table 200 (FIG. 6). Following step 102, the histogram module 40 enters a loop defined by steps 104 through 134 in which it periodically updates the value of jbLatency 55 until such time as a reset signal 57 is received.

Step 104 represents obtaining a value of delay 63 from the delay calculation circuit 38 and step 106 represents generating a histogram value 136. As discussed, the histogram value 136 is equal to the value of delay 63 less the value of jbLatency 55. Step 108 represents storing the histogram value 136 in a bin of a sub-gram of the memory 41.

As previously discussed, the value of jbLatency 55 is periodically updated using a histogram of delay values (e.g. output time stamp 59 less transmission time stamp 58) to select a target delay that would have resulted in a predetermined portion of the frames being dropped.

The problem is that the value of output time stamp 59 is itself effected by the value of jbLatency 55 that was in use at the time the frame was written to the jitter buffer 44. Therefore, if delay values were used for a histogram, an iterative approach to determine target delay would be required. More specifically, the system would have to select a trial target delay, adjust all of the delay values to what the delay value would have been if jbLatency had been set to the trial target delay, determining the portion of frames that would have been dropped, and then re-adjusting the trail target delay.

Therefore, rather than storing the value of delay 63 in the histogram memory 41, the histogram value 136 is stored in a bin of a sub-gram. The sub-gram comprises a predetermined plurality of bins defined by the value of bin 216 in the configuration value table 200 (FIG. 6). Because the value of jbLatency 55 is only adjusted upon completion of a sub-gram, all histogram values 136 in the sub-gram are calculated using the same value of jbLatency 55. Further, to determine a target delay, all of the delay values have already been normalized by subtracting the current value of jbLatency. Or stated another way, the histogram value is what the delay value would have been had the jbLatency value been zero at the time the frame was written to the jitter buffer 44.

Step 110 represents determining whether the sub-gram is complete. If the sub-gram has stored a predetermined number of values, it is complete. If not, the histogram module 40 returns to step 104 to again receive a value of delay 63 from the delay calculation module 38.

When the sub-gram is complete, the delay calculation module 40 performs steps 112 through 134 for updating the value of jbLatency 55. Step 112 represents determining a target delay value. As discussed, the target delay value is the value which, if used as the value of jbLatency 55 for the most recently received predetermined quantity of frames (e.g. the frames of the most recently predetermined number of sub-grams—with the predetermined number of sub-grams being equal to the value of grams 214 in the configuration value table 200) would have resulted in a predetermined portion of the frames being dropped. The predetermined portion of frames (in units of frames per thousand) being equal to the value of dropsPerMil 218 in the configuration table.

More specifically, the target delay value is determined by selecting the histogram value that results in the predetermined portion of the histogram values 136 being less than the histogram value. This histogram value can be called the low value. The target delay value is then the difference between zero and this low value. It should be appreciated that because the value of dropsPerMil 218 will be a small percentage of all frames and because the histogram values have been normalized to values (as if jbLatency had been zero), the low value will always be less than zero.

To determine the adjustment to jbLatency 55, a target value is calculated. The target value is the absolute value of the low value—or stated another way, the difference between zero and the low value.

In addition, an adjustment in the value of jbLatency 55 will cause a discontinuity in the value of output time stamp 59 between sequential frames. Frames must be deleted or added to accommodate this discontinuity. To determine deletion or addition to frames, the following calculations are used. First, the value of jbLatency 55 is added to the low value. If the resulting value is greater than zero, frames equal to the resulting value divided by the output time stamp increment must be dropped. Similarly, if the resulting value is less than zero, frame equal to the resulting value divided by the output time stamp increment must be created and added to the jitter buffer 44.

In general, the value of jbLatency 55 will be updated to the target delay value (and the appropriate frame adjustments made) at step 130. However, in certain instances, there are practical limits on adjustments that should be made to the value of jbLatency 55. Steps 114, 118, 122, and 126 represent testing the practical limits. More specifically, at step 114, if the change in the value of jbLatency 55 would be less than a predetermined hysteresis value (e.g. value of hysteresis 220 in the configuration value table 200), the value of jbLatency 55 is not changed as the change would be too small and result in too frequent of adjustments that are not really necessary.

At step 116, if the target delay is greater than a predetermined maximum delay (e.g. value of maxDelay 210 in the configuration value table 200), the value of jbLatency 55 is set to maxDelay 210 (and the frames adjusted accordingly) at step 117 rather than the target delay. Typically maxDelay

210 will be selected as a value that is on the threshold of noticeable delay to the user and greater frame loss would be more tolerable to the user than greater delay.

At step 118, if the target delay is less than a predetermined minimum jbLatency (e.g. value of minLatency 208 in the configuration value table 200), the value of jbLatency 55 is set to minLatency 208 (and the frames adjusted accordingly) at step 119 rather than the target delay.

At step 120, if the adjustment in jbLatency 55 will be a decrement greater than a predetermined maximum decrement (e.g. value of maxDrops 222 in the configuration value table 200), then the value of jbLatency 55 will be decremented by maxDrops 222 at step 121 rather than to the target delay.

At step 120, if the adjustment in jbLatency 55 will be a decrement greater than a predetermined maximum decrement (e.g. value of maxDrops 222 in the configuration value table 200), then the value of jbLatency 55 will be decremented by maxDrops 222 rather at step 121 rather than to the target delay.

At step 122, if the adjustment in jbLatency 55 will be an increment greater than a predetermined maximum increment (e.g. value of maxAdds 224 in the configuration value table 200), then the value of jbLatency 55 will be incremented by maxAdds 222 at step 123 rather than to the target delay.

If none of the limits are reached at tests 114-122, then at step 130, the value of jbLatency 55 is updated to the target delay. Step 132 represents starting a new sub-gram into which histogram values will be stored and dropping the oldest sub-gram from future calculations of target latency. The configuration value table 200 includes a value of grams 214 which defines the quantity of sub-grams used for calculating jbLatency 55. Because a new sub-gram has been created, the oldest is dropped to assure that the quantity of sub-grams used for calculation remains at the value of grams 214.

Step 134 comprises providing the value of jbLatency 55 to the output time stamp index 42 and associating the value of jbLatency 55 with the new sub-gram.

It should be appreciated that the systems and methods discussed herein provide for a jitter buffer system which corrects for variations in transport time between frames—and more specifically dynamically adjusts jitter buffer latency based on histogram characteristics to target a frame loss value that optimizes audio degradation trade off between excessive frame loss and excessive latency.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

The invention claimed is:

1. A jitter buffer system for reducing jitter in a packet audio reception device, the jitter buffer system comprising:
   a jitter buffer for storing plurality of audio frames and providing each of the plurality of audio frames to a decompression circuit upon receipt of a signal therefore;
   a delay calculation module for receiving each of the plurality of audio frames, and for each of the plurality of audio frames:
   calculating a delay value, the delay value being equal to a time difference between an output time stamp value and a transmission time stamp assigned to the frame by a transmitting system; and
   writing the frame to the jitter buffer;
   a output time stamp index for determining an initial value of the output time stamp value following receipt of a jitter buffer latency value and incrementing the output time stamp value upon each release of a frame from the jitter buffer to the decompression circuit, the initial value being equal to the sum of the transmission time stamp assigned to the first frame and the jitter buffer latency value, each incremental output time stamp being an incremental time period added to the output time stamp value;
   a histogram module coupled to each of the output time stamp index and the delay calculation module, the histogram module for periodically calculating a target delay value which, based on a buffered history of values representing the delay value of each of a fixed quantity of the most recently received frames from the sequence of receive frames, would have resulted in a predetermined portion of the fixed quantity of frames being dropped, adjusting the jitter buffer latency value to a value equal to the target value, and providing the jitter buffer latency value to the output time stamp index.

2. The jitter buffer system of claim 1, wherein the delay calculation module further provides for:
   dropping the frame if the delay value is less than zero;
   dropping the frame if the delay value is greater than a predetermined maximum delay value; and
   writing the frame to the jitter buffer only if the delay value is greater than zero and less than a predetermined maximum.

3. The jitter buffer system of claim 2, wherein the histogram module only adjusts the jitter buffer latency value to the target value if the difference between the jitter buffer latency value and the target value is greater than a preconfigured hysteresis threshold.

4. The jitter buffer system of claim 2, wherein the histogram module further:
   adjusts the jitter buffer latency value to a maximum preconfigured jitter buffer latency value if the target delay value is greater than the maximum preconfigured jitter buffer latency value; and
   adjusts the jitter buffer latency value to a minimum preconfigured jitter buffer latency value if the target delay value is less than the minimum preconfigured jitter buffer latency value.

5. The jitter buffer system of claim 2, wherein the histogram module further
   decrements the jitter buffer latency value by a predetermined maximum decrement value if adjusting the jitter buffer latency value to the target delay would result in decrementing the jitter buffer latency value by more than the predetermined maximum decrement value; and
   increments the jitter buffer latency value by a predetermined maximum increment value if adjusting the jitter buffer latency value to the target delay would result in incrementing the jitter buffer latency value by more than the predetermined maximum increment value.

6. The jitter buffer system of claim 2, wherein the histogram module:
  calculates a histogram value from each delay value, the histogram value being the delay value less the then current jitter buffer latency value;
  stores each histogram value in a sub gram associated with the then current jitter buffer latency value, the sub gram storing a predetermined quantity of histogram values and being complete when the predetermined quantity of histogram values have been stored in the sub-gram; and
  calculating a target delay value upon completion of the sub-gram; the target delay value being a value which would have resulted in a predetermined portion of the frames associated with the histogram values stored in a predetermined quantity of the most recently completed sub-grams being dropped.

7. The jitter buffer system of claim 6, wherein the histogram module calculates the target delay value by:
  determining a low value which the predetermined portion of the histogram values are less than the low value and the remainder of the histogram values are greater than the low value; and
  setting the target delay value to the difference between zero and the low value.

8. The jitter buffer system of claim 6, wherein the histogram module only adjusts the jitter buffer latency value to the target value if the difference between the jitter buffer latency value and the target value is greater than a preconfigured hysteresis threshold.

9. The jitter buffer system of claim 6, wherein the histogram module further:
  adjusts the jitter buffer latency value to a maximum preconfigured jitter buffer latency value if the target delay value is greater than the maximum preconfigured jitter buffer latency value; and
  adjusts the jitter buffer latency value to a minimum preconfigured jitter buffer latency value if the target delay value is less than the minimum preconfigured jitter buffer latency value.

10. The jitter buffer system of claim 6, wherein the histogram module further
  decrements the jitter buffer latency value by a predetermined maximum decrement value if adjusting the jitter buffer latency value to the target delay would result in decrementing the jitter buffer latency value by more than the predetermined maximum decrement value; and
  increments the jitter buffer latency value by a predetermined maximum increment value if adjusting the jitter buffer latency value to the target delay would result in incrementing the jitter buffer latency value by more than the predetermined maximum increment value.

11. A method of reducing jitter in a packet audio reception device, the method comprising:
  receiving each of a plurality of audio frames;
  for each of the plurality of audio frames;
    calculating a delay, the delay value being equal to a time difference between an output time stamp value and a transmission time stamp assigned to the frame by a transmitting system;
    dropping the frame if the delay value is less than zero;
    dropping the frame if the delay value is greater than a predetermined maximum delay value; and
    storing the frame in a jitter buffer only if the delay value is greater than zero and less than the predetermined maximum delay value;
  providing each of the plurality of audio frames stored in the jitter buffer to a decompression circuit upon receipt of a signal therefore;
  determining an initial output time stamp value upon each adjustment of a jitter buffer latency value, the initial output time stamp value being equal to the sum of the transmission time stamp and the jitter buffer latency value;
  incrementing the output time stamp value upon each release of a frame from the jitter buffer;
  periodically calculating a target delay value which, based on a buffered history of values representing the delay value of each of a fixed quantity of the most recently received frames from the sequence of receive frames, would have resulted in a predetermined portion of the fixed quantity of frames being dropped; and
  adjusting the jitter buffer latency value to a value equal to the target delay value.

12. The method of claim 11, wherein the step of adjusting the jitter buffer latency value to the target value is only performed if the difference between the jitter buffer latency value and the target value is greater than a preconfigured hysteresis threshold.

13. The method of claim 11, further comprising:
  adjusting the jitter buffer latency value to a maximum preconfigured jitter buffer latency value if the target delay value is greater than the maximum preconfigured jitter buffer latency value; and
  adjusting the jitter buffer latency value to a minimum preconfigured jitter buffer latency value if the target delay value is less than the minimum preconfigured jitter buffer latency value.

14. The method of claim 11, further comprising:
  decrementing the jitter buffer latency value by a predetermined maximum decrement value if adjusting the jitter buffer latency value to the target delay would result in decrementing the jitter buffer latency value by more than the predetermined maximum decrement value; and
  incrementing the jitter buffer latency value by a predetermined maximum increment value if adjusting the jitter buffer latency value to the target delay would result in incrementing the jitter buffer latency value by more than the predetermined maximum increment value.

15. The method of claim 11, further comprising:
  calculating a histogram value from each delay value, the histogram value being the delay value less the then current jitter buffer latency value;
  storing each histogram value in a sub gram associated with the then current jitter buffer latency value, the sub gram storing a predetermined quantity of histogram values and being complete when the predetermined quantity of histogram values have been stored in the sub-gram; and
  calculating the target delay value upon completion of the sub-gram; the target delay value being the value which would have resulted in a predetermined portion of the frames associated with the histogram values stored in a predetermined quantity of the most recently completed sub-grams being dropped.

16. The method of claim 15, wherein the step of calculating the target delay value comprises:
  determining a low value which the predetermined portion of the histogram values are less than the low value and the remainder of the histogram values are greater than the low value; and setting the target delay value to the difference between zero and the low value.

17. The method of claim 15, wherein the step of adjusting the jitter buffer latency value to the target value is only performed if the difference between the jitter buffer latency value and the target value is greater than a preconfigured hysteresis threshold.

18. The method of claim 15, further comprising:

adjusts the jitter buffer latency value to a maximum preconfigured jitter buffer latency value if the target delay value is greater than the maximum preconfigured jitter buffer latency value; and adjusts the jitter buffer latency value to a minimum preconfigured jitter buffer latency value if the target delay value is less than the minimum preconfigured jitter buffer latency value.

19. The method of claim 15, further comprising:

decrements the jitter buffer latency value by a predetermined maximum decrement value if adjusting the jitter buffer latency value to the target delay would result in decrementing the jitter buffer latency value by more than the predetermined maximum decrement value; and increments the jitter buffer latency value by a predetermined maximum increment value if adjusting the jitter buffer latency value to the target delay would result in incrementing the jitter buffer latency value by more than the predetermined maximum increment value.

* * * * *